US008164603B2

(12) United States Patent
Lee et al.

(10) Patent No.: US 8,164,603 B2
(45) Date of Patent: Apr. 24, 2012

(54) METHODS OF MEASURING IMAGE-STICKING OF A DISPLAY

(75) Inventors: Chien-Pang Lee, Taoyuan County (TW); Chien-Hui Yang, Taichung (TW); Ming-Wei Huang, Taoyuan County (TW); Mei-Chi Fu, Taoyuan County (TW); Pai-Chung Chien, Taoyuan County (TW)

(73) Assignee: Chunghwa Picture Tubes, Ltd., Taoyuan (TW)

( * ) Notice: Subject to any disclaimer, the term of this patent is extended or adjusted under 35 U.S.C. 154(b) by 1167 days.

(21) Appl. No.: 11/954,242

(22) Filed: Dec. 12, 2007

(65) Prior Publication Data

US 2008/0303766 A1 Dec. 11, 2008

(30) Foreign Application Priority Data

Jun. 8, 2007 (TW) ............................... 96120714 A
Jun. 15, 2007 (TW) ............................... 96121870 A

(51) Int. Cl.
*G09G 5/10* (2006.01)
*G09G 5/02* (2006.01)
*G09G 3/36* (2006.01)
*H04N 17/00* (2006.01)
*G02F 1/13* (2006.01)

(52) U.S. Cl. .......... 345/690; 345/694; 345/89; 348/177; 349/192

(58) Field of Classification Search .................... 345/60, 345/89, 94–95, 98–99, 204, 207, 211–214, 345/690, 694; 349/192; 324/760.01; 348/177–191
See application file for complete search history.

(56) References Cited

U.S. PATENT DOCUMENTS

| | | | | |
|---|---|---|---|---|
| 6,590,411 | B2 | 7/2003 | Lee | |
| 6,791,520 | B2 | 9/2004 | Choi | |
| 7,847,772 | B2 * | 12/2010 | Choi et al. | 345/89 |
| 2002/0097395 | A1 | 7/2002 | Smith et al. | |
| 2003/0214586 | A1 * | 11/2003 | Lee et al. | 348/180 |

* cited by examiner

*Primary Examiner* — Bipin Shalwala
*Assistant Examiner* — Keith Crawley
(74) *Attorney, Agent, or Firm* — Jianq Chyun IP Office

(57) ABSTRACT

A method of measuring image-sticking of a display is described. A display having N gray levels is provided. Next, an image-stick test frame having at least a first pattern having a low gray level and at least a second pattern having a high gray level is displayed on the display. After the image-stick test frame is displayed for a while, an image-stick region and a non-image-stick region are formed on the display. A measuring frame is then displayed on the display, wherein the non-image-stick region in the measuring frame has a standard gray level M. A plurality of middle gray levels is sequentially displayed on the image-stick region in the measuring frame. When the boundary between the non-image-stick region and the image-stick region in measuring frame is the lightest, the middle gray level is converted into an image-sticking level.

14 Claims, 5 Drawing Sheets

METHODS OF MEASURING IMAGE-STICKING OF A DISPLAY

CROSS-REFERENCE TO RELATED APPLICATION

This application claims the priority benefits of Taiwan applications serial no. 96120714, filed on Jun. 8, 2007 and serial no. 96121870, filed on Jun. 15, 2007. All disclosures of the Taiwan applications are incorporated herein by reference.

BACKGROUND OF THE INVENTION

1. Field of the Invention

The present invention relates to a method of measuring image-sticking phenomenon of a display. More particularly, the present invention relates to a method which may accurately measure an image-sticking level of a display.

2. Description of Related Art

Image-sticking is a phenomenon that an image or an outline of a previous static image appears in a next frame. Namely, when a static image is displayed on a screen for a relatively long time, it remains visible when the image is changed. Generally, the image-sticking phenomenon is observed by human eyes due to excessive brightness or color difference between an image-stick region and a non-image-stick region.

Presently, the criterion and measuring standard of image-sticking levels are still not standardized due to improper measuring methods or impossible implementation of the measuring methods. The existing methods are described as follows.

The method provided by US Pub. No. 2003/0214586 is employed to measure the image-sticking levels by applying a charge coupled device (CCD). However, since the CCD cannot accurately simulate a sense of human eyes and cannot effectively quantify the sense, the method cannot be practically applied.

The method provided by U.S. Pat. No. 6,791,520 is employed to measure the image-sticking levels according to a brightness difference. However, this method is susceptible to an interference of the color difference, and since the image-sticking phenomenon relates to an obvious degree of a boundary between different image-stick regions, the image-sticking level cannot be determined according to the brightness difference. Therefore, this measuring method is likewise not practically applicable.

The method provided by US Pub. No. 2002/0097395 is employed to measure the image-sticking levels by changing gray levels based on a variation of voltages. However, this measuring method can only be applied to a liquid crystal display (LCD). Moreover, since a resistance on a test panel has to be changed for further subdivision of the voltages on an original γresistance curve, this measurement method cannot actually be applied on the products.

The method provided by U.S. Pat. No. 6,590,411 is employed to measure the image-sticking level according to the variation of capacitances. This measurement method can only be applied to the LCD. Moreover, since a plurality of parasitic capacitances generated in a panel structure may interfere a measurement result, this measurement method can only be applied a test panel having a simple structure, and the measuring result cannot directly be applied to the products.

SUMMARY OF THE INVENTION

The present invention is directed to a method of measuring an image-sticking phenomenon of a display, which may accurately measure an image-sticking level of the display. This measuring method can be applied to different kinds of displays.

The present invention is directed to a method of measuring an image-sticking phenomenon of a display, which may automatically and accurately measure an image-sticking level of a display.

The present invention provides a method of measuring an image-sticking phenomenon of a display. First, a display having N gray levels is provided. Next, an image-stick test frame is displayed on the display, wherein the image-stick test frame is composed of at least a first pattern having a low gray level and at least a second pattern having a high gray level. After the image-stick test frame is displayed for a while, an image-stick region and a non-image-stick region are formed on the display, wherein the image-stick region is located at a region where one of the first and the second patterns is positioned and the non-image-stick region is located at a region where the other one of the first and the second patterns is positioned. A measuring frame is then displayed on the display, wherein the non-image-stick region in the measuring frame has a standard gray level M. A plurality of middle gray levels are sequentially displayed on the image-stick region in the measuring frame, wherein the middle gray levels are between M and M+1 or M−1 and M. When the boundary between the non-image-stick region and the image-stick region in measuring frame is the lightest, the middle gray level is converted into an image-sticking level.

In an embodiment of the present invention, the method of displaying the middle gray levels between M and M+1 or between M−1 and M on the image-stick region in the measuring frame includes: displaying the gray level M on a part of pixels and displaying the gray level M+1 or M−1 on another part of pixels; and forming a plurality of the aforementioned middle gray levels by adjusting the number of the pixels displaying the gray level M and the number of the pixels displaying the gray level M+1 or M−1.

In an embodiment of the present invention, the method of displaying the middle gray levels between M and M+1 or M and M−1 on the image-stick region in the measuring frame includes: alternately displaying the gray level M and the gray level M+1 or M−1, wherein the time for displaying the gray level M is a first time, and the time for displaying the gray level M+1 or M−1 is a second time; and forming a plurality of the aforementioned middle gray levels by adjusting a display time or a display frequency of the first time and the second time.

In an embodiment of the present invention, distribution of the first pattern and the second pattern of the aforementioned image-stick test frame comprises a chessboard distribution.

In an embodiment of the present invention, the first pattern of the aforementioned image-stick test frame is located in the middle of the image-stick test frame, and the second pattern surrounds the first pattern.

In an embodiment of the present invention, the second pattern of the aforementioned image-stick test frame is located in the middle of the image-stick test frame, and the first pattern surrounds the second pattern.

In an embodiment of the present invention, the aforementioned display is a liquid crystal display or a plasma display panel.

In an embodiment of the present invention, the gray level of the aforementioned first pattern is gray level 1, and the gray level of the second pattern is gray level N.

In an embodiment of the present invention, an optical measuring instrument is further provided for judging whether the boundary between the non-image-stick region and the image-stick region is the lightest. The optical measuring instrument measures the images displayed on the image-stick region and on the non-image-stick region, and obtains a first value and a second value respectively. When the first value is actually the same to the second value, the boundary between the non-image-stick region and the image-stick region is the lightest.

In an embodiment of the present invention, the aforementioned optical measuring instrument includes a luminance meter, a colorimeter and a spectrometer.

The present invention provides a method of measuring an image-sticking phenomenon of a display. The method includes the following steps. First, a display having a plurality of pixels is provided. Next, an image-stick test frame is displayed on the display, wherein the image-stick test frame is composed of at least a first pattern and at least a second pattern, and the gray level of the first pattern is different from that of the second pattern. After the image-stick test frame is displayed for a while, an image-stick region and a non-image-stick region are formed on the display. Then, a measuring frame is displayed on the display, wherein the gray level of the non-image-stick region in the measuring frame is an integer. Next, at least one middle gray level is displayed on the image-stick region in the measuring frame, wherein the value of the middle gray level is between two consecutive integers. Then, images respectively displayed on the image-stick region and the non-image-stick region are captured by an image capture device to form an image data. Next, an image processing procedure is performed on the image data to obtain an evaluation value. Finally, the evaluation value is converted into an image-sticking level.

In an embodiment of the present invention, the aforementioned image data includes at least a color and a brightness of the image-stick region and the non-image-stick region.

In an embodiment of the present invention, the aforementioned image processing procedure includes the following steps. First, the color and the brightness of the adjacent pixels are compared to obtain a plurality of variation values of the pixels. Next, a just noticeable distortion (JND) is provided and the pixels having the variation values greater than the JND is detected, so as to obtain the evaluation value.

In an embodiment of the present invention, the evaluation value is obtained by calculating a summation of multiplication of the number of the pixels having the variation value being greater than the JND and the corresponding variation values.

In an embodiment of the present invention, the method of measuring the image-sticking phenomenon of the display further includes displaying a plurality of the middle gray levels on the display.

In an embodiment of the present invention, the aforementioned image capture device sequentially captures the images displayed on the image-stick region and on the non-image-stick region when each of the middle gray levels is applied.

In an embodiment of the present invention, the images displayed on the aforementioned image-stick region and the non-image-stick region include the images displayed when the boundary between the non-image-stick region and the image-stick region is the lightest.

In an embodiment of the present invention, the aforementioned image capture device includes a charge coupled device (CCD).

Since a plurality of the middle gray levels can be subdivided between the gray level M and the gray level M+1, a tiny difference of different brightness or different colors can be observed, such that the image-sticking level can be accurately measured.

In order to make the aforementioned and other objects, features and advantages of the present invention comprehensible, a preferred embodiment accompanied with figures is described in detail below.

DESCRIPTION OF EMBODIMENTS

When a difference of output gray levels of the brightness between an image-stick region and a non-image stick region is greater than one gray level, an image-sticking phenomenon will be observed by human eyes. Therefore, an image-sticking level of a display is one of important standards of a qualified product. Moreover, as to a liquid crystal display (LCD), the image-sticking phenomenon is subjected to the material of a liquid crystal, matching of the liquid crystal and the related materials, the processing conditions, and a cleanliness of the process etc. As to a plasma display panel, the image-sticking phenomenon is subjected to a driving method, the material of the passivation layer and the phosphor Layer, and an operation temperature etc. Therefore, if the image-sticking level of the display can be accurately measured, when a new processing condition is added, variation of the image-sticking level due to the new processing condition can be accurately measured.

The method provided by the present invention for measuring the image-sticking phenomenon of the display may accurately measure the differences of the image-sticking levels. This method can be applied to different kinds of displays. The following embodiments are used for describing the present invention and conveying the concept of the invention to those skilled in the art, and are not intended for limiting the scope of the present invention.

The First Embodiment

First, a display having N gray levels is provided. In an embodiment of the present invention, the display comprises a LCD. In another embodiment, the display comprises a plasma display panel.

Figure 1:
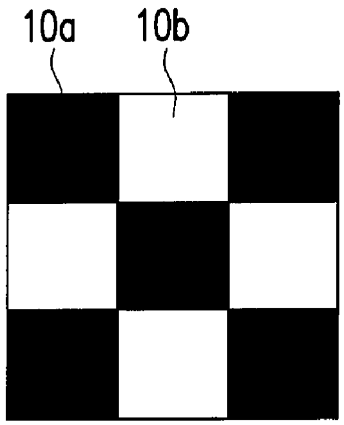
FIGS. 1~3 are schematic diagrams respectively illustrating an image-stick test frame according to an embodiment of the present invention.
Figure 2:
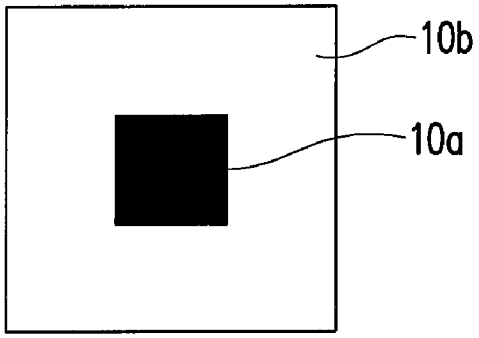
Figure 3:
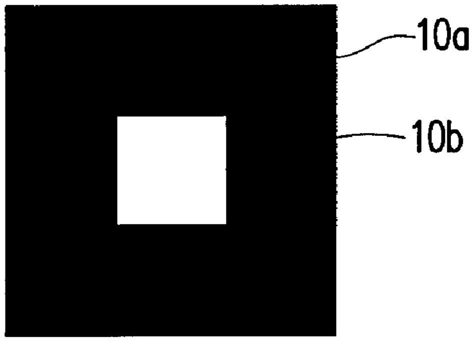

Next, an image-stick test frame is displayed on the display, as shown in FIG. 1, the image-stick test frame is composed of at least a first pattern 10*a* having a low gray level and at least a second pattern 10*b* having a high gray level. In an exemplary embodiment, the gray level of the first pattern 10*a* may be gray level 1, and the gray level of the second pattern 10*b* may be gray level N. Moreover, distributions of the first pattern 10*a* and the second pattern 10*b* of the image-stick test frame are diverse. For example, in an embodiment of the present invention, the distribution of the first pattern 10*a* and the second pattern 10*b* of the image-stick test frame comprises a chessboard distribution (shown as FIG. 1). In another embodiment, the first pattern 10*a* of the image-stick test frame is located in the middle of the image-stick test frame, and the second pattern 10*b* surrounds the first pattern 10*a* (shown as FIG. 2). In still another embodiment, the second pattern 10*b* of the image-stick test frame is located in the middle of the image-stick test frame, and the first pattern 10*a* surrounds the second pattern 10*b* (shown as FIG. 3). In the present embodiment, the chessboard distribution shown in FIG. 1 is taken as an example.

Figure 4A:
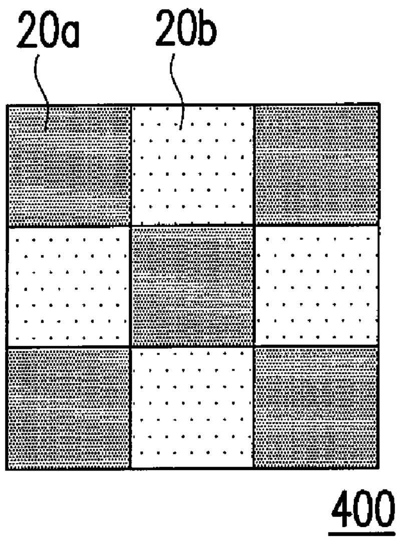
FIGS. 4A~4D are schematic diagrams respectively illustrating a measuring frame according to an embodiment of the present invention.

As to the LCD having a normally white frame when not being driven, after the image-stick test frame is displayed on the LCD for a while, an image-stick region (e.g. a region where the first pattern 10*a* is located) and a non-image-stick region (e.g. a region where the second pattern 10*b* is located) are formed on the LCD. Conversely, as to the LCD having a normally black frame when not being driven, after the image-stick test frame is displayed on the LCD for a while, the non-image-stick region (e.g. the region where the first pattern 10*a* is located) and the image-stick region (e.g. the region where the second pattern 10*b* is located) are formed on the LCD. The LCD having the normally white frame when not being driven will be taken as an example in the following description. Next, a measuring frame 400 is displayed on the display, as shown in FIG. 4A. A block 20*b* in the measuring frame 400 corresponds to the non-image-stick region, and has a standard gray level M. In the present embodiment, the block 20*b* (corresponding to the non-image-stick region) has a gray level M (e.g. gray level 120). In addition, a block 20*a* corresponds to the image-stick region, and a plurality of middle gray levels are sequentially displayed on the block 20*a* to compare with the gray level displayed on the block 20*b*, wherein the middle gray levels displayed on the block 20*a* are between M and M+1.

It should be noted that the standard gray level (gray level M) displayed on the block 20*b* (non-image-stick region) is around a middle value of N gray levels that the display has. For example, gray level M is equal to gray level N/2, gray level (N/2)+1 or gray level (N/2)−1 etc. Moreover, setting of the middle gray levels is variable. For example, as to the LCD having the normally black frame when not being driven, the block 20*a* corresponding to the non-image-stick region has the standard gray level (gray level M), the block 20*b* corresponding to the image-stick region has the middle gray levels between M−1 and M. Namely, setting of the middle gray levels can be adjusted according to the features of the display and a sense of human eyes. In addition, the gray level (gray level M) of the present invention is converted into a corresponding image-sticking level Rank X. For example, the gray level M (gray level 120) corresponds to an image-sticking level Rank 1, and the gray level M+1 (gray level 121) corresponds to an image-sticking level Rank 2.

In addition, a plurality of the middle gray levels sequentially displayed on the block 20*a* (image-stick region) are between the gray level M and the gray level M+1. In another embodiment, as to the LCD having the normally black frame when not being driven, a plurality of the middle gray levels sequentially displayed on the block 20*b* (image-stick region) are between the gray level M−1 and the gray level M. In the present embodiment, the middle gray levels between the gray level M and the gray level M+1 are taken as an example, for example, the middle gray levels 120.25, 120.5 and 120.75 between the gray level 120 and the gray level 121. The above gray levels (gray levels 120, 120.25, 120.5, 120.75 and 121) correspond to the image-sticking levels Rank 1, Rank 1.25, Rank 1.5, Rank 1.75 and Rank 2, respectively. Those skilled in the art may deduce the middle gray levels between M−1 and M according to the above method, and the repeated description will be omitted hereby.

In the present embodiment, displaying of the middle gray levels between the gray level M and the gray level M+1 on the block 20*a* (image-stick region) can be implemented by the following editing method.

Figure 5A:
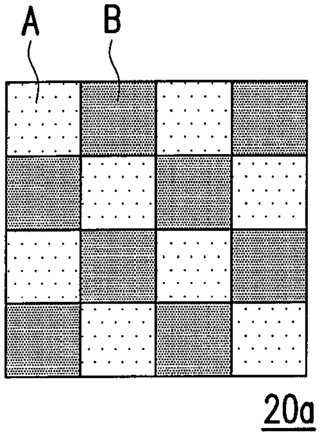
FIG. 5A is a schematic diagram illustrating a method of editing the middle gray levels according to an embodiment of the present invention.
Figure 5B:
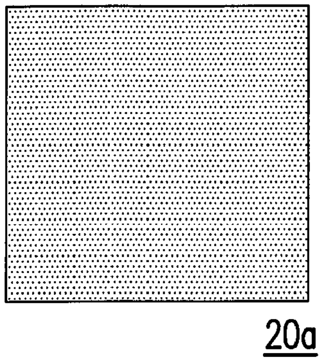
FIG. 5B is a diagram illustrating a middle gray level 120.5 formed based on the editing method of FIG. 5A.

Referring to FIG. 5A, the block 20*a* (image-stick region) includes a plurality of pixels, wherein pixels A have the gray level M+1 (e.g. gray level 121), and pixels B have the gray level M (e.g. gray level 120). As shown in FIG. 5A, 50% of the block 20*a* comprises the pixels A, and 50% of the block 20*a* comprises the pixels B. Therefore, based on this editing method, the block 20*a* has the gray level 120.5, as shown in FIG. 5B.

Figure 6A:
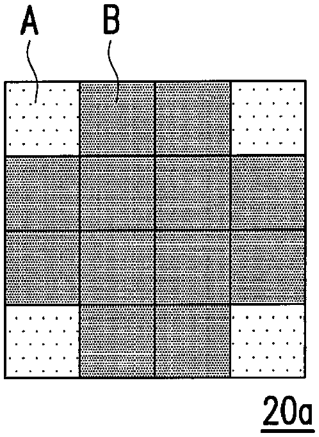
FIG. 6A is a schematic diagram illustrating a method of editing the middle gray levels according to an embodiment of the present invention.
Figure 6B:
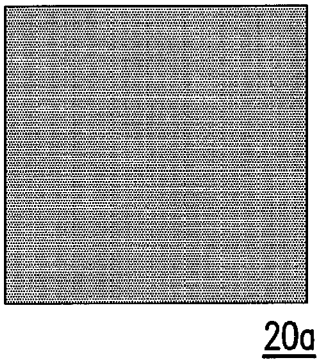
FIG. 6B is a diagram illustrating a middle gray level 120.25 formed based on the editing method of FIG. 6A.

Moreover, referring to FIG. 6A, the pixels A have the gray level M+1 (e.g. gray level 121), and the pixels B have the gray level M (e.g. gray level 120). In FIG. 6A, 25% of the block 20*a* comprises the pixels A, and 75% of the block 20*a* comprises the pixels B. Therefore, based on this editing method, the block 20*a* has the gray level 120.25, as shown in FIG. 6B.

Figure 7A:
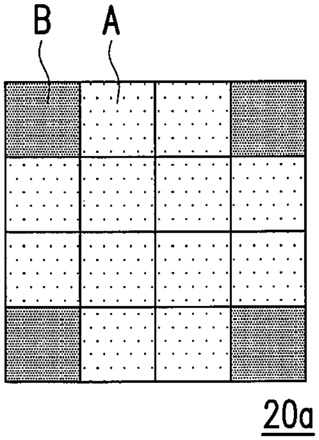
FIG. 7A is a schematic diagram illustrating a method of editing the middle gray levels according to an embodiment of the present invention.
Figure 7B:
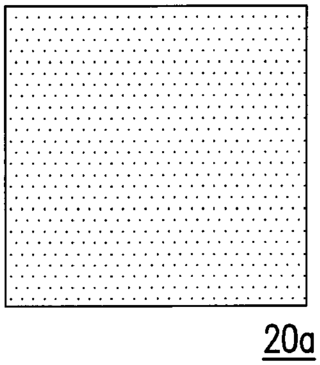
FIG. 7B is a diagram illustrating a middle gray level 120.75 formed based on the editing method of FIG. 7A.

Next, referring to FIG. 7A, the pixels A have the gray level M+1 (e.g. gray level 121), and the pixels B have the gray level M (e.g. gray level 120). In FIG. 7A, 75% of the block 20*a* comprises the pixels A, and 25% of the block 20*a* comprises the pixels B. Therefore, based on this editing method, the block 20*a* has the gray level 120.75, as shown in FIG. 7B.

In other words, the middle gray levels are formed by adjusting the number of the pixels having the gray level M and the number of the pixels having the gray level M+1 on the block 20*a*, and the difference between a maximum level and a minimum gray level of an individual pixel on the block 20*a* is one gray level. Three middle gray levels divided between the gray level 120 and the gray level 121 are taken as an example in the aforementioned method. However, the present invention is not limited by the three middle gray levels, more middle gray levels between the gray level 120 and the gray level 121 can be further divided according to an actual requirement of a product.

The aforementioned method of forming a plurality of the middle gray levels between the gray level M and the gray level M+1 is based on edition of space. However, a method based on edition of time can also be applied to form a plurality of the middle gray levels between the gray level M and the gray level M+1. The method may be described as follows.

After the gray level M (e.g. gray level 120) is displayed on the block 20*a* for a while, the gray level M+1 (e.g. gray level 121) is displayed on the block 20*a*. The middle gray level is formed by alternately displaying the gray level M (e.g. gray level 120) and the gray level M+1 (e.g. gray level 121). For example, if 50% of the time is used for displaying the gray level M (e.g. gray level 120), and another 50% of the time is used for displaying the gray level M+1 (e.g. gray level 121), the middle gray level formed by alternately displaying the gray level M and the gray level M+1 is the gray level 120.5.

Similarly, if 25% of the time is used for displaying the gray level M (e.g. gray level 120), and 75% of the time is used for displaying the gray level M+1 (e.g. gray level 121), the middle gray level formed by alternately displaying the gray level M and the gray level M+1 is the gray level 120.75.

If 75% of the time is used for displaying the gray level M (e.g. gray level 120), and 25% of the time is used for displaying the gray level M+1 (e.g. gray level 121), the middle gray level formed by alternately displaying the gray level M and the gray level M+1 is the gray level 120.25.

According to the above method, the middle gray levels are formed by adjusting a display time of the gray level M (e.g. gray level 120) and the display time of the gray level M+1. However, the present invention is not limited thereto, the middle gray levels can also be formed by adjusting a display frequency of the gray level M (e.g. gray level 120) and the gray level M+1. Moreover, three middle gray levels divided between the gray level 120 and the gray level 121 are taken as an example in the aforementioned method. However, the present invention is not limited thereto, more middle gray levels can be further divided between the gray level M and the gray level M+1 according to an actual requirement of a product.

Referring to FIG. 4A again, as described above, in the measuring frame 400, the block 20*b* (non-image-stick region) and the block 20*a* have a standard gray level (e.g. gray level 120). The boundary between the block 20*a* and the block 20*b* is quite obvious when comparing the block 20*a* (image-stick region) with the block 20*b* (non-image-stick region). Next, referring to FIG. 4B, another middle gray level (e.g. gray level 120.25) which may be formed by the editing method of FIGS. 6A and 6B is applied to the block 20*a* (image-stick region). Similarly, the boundary between the block 20*a* and the block 20*b* is still quite obvious when comparing the block 20*a* (image-stick region) with the block 20*b* (non-image-stick region). Next, referring to FIG. 4C, yet another middle gray level (e.g. gray level 120.5) which may be formed by the editing method of FIGS. 5A and 5B is applied to the block 20*a* (image-stick region). The boundary between the block 20*a* and the block 20*b* still exists when comparing the block 20*a* (image-stick region) with the block 20*b* (non-image-stick region). Next, referring to FIG. 4D, yet another middle gray level (e.g. gray level 120.75) which may be formed by the editing method of FIGS. 7A and 7B is applied to the block 20*a* (image-stick region). The boundary between the block 20*a* and the block 20*b* is almost invisible (lightest). Therefore, this middle gray level (gray level 120.75) can be converted into the image-sticking level Rank 1.75.

Figure 4B:
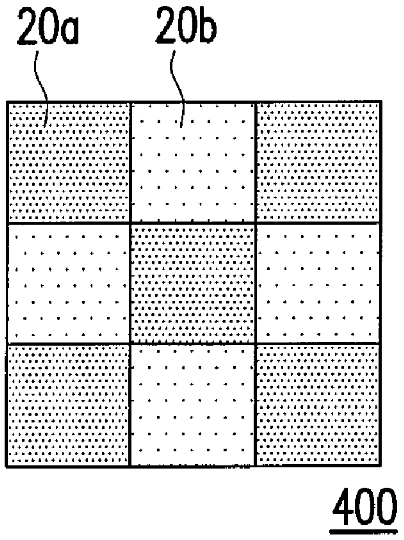
Figure 4C:
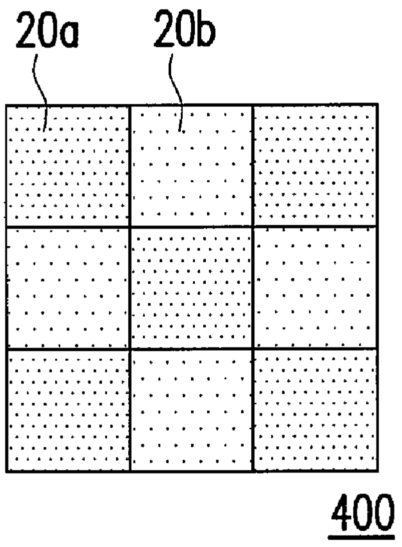

In the embodiment described in FIG. 4A to FIG. 4B, the gray level 120 is displayed on the block 20*b* (non-image stick region) as the standard gray level, and the middle gray levels 120.25, 120.5 and 120.75 between the gray level 120 and the gray level 121 are displayed in sequence on the block 20*a* (image-stick region) to compare with the standard gray level. In another embodiment, as to the LCD having the normally black frame when not being driven, the gray level 120 may also be used as the standard gray level, and the middle gray levels 119.25, 119.5 and 119.75 between the gray level 119 and the gray level 120 are displayed in sequence on the block 20*b* (image-stick region) to compare with the standard gray level, so as to establish the image-sticking level. In other words, in the present embodiment, three image-sticking levels Rank 1.25, Rank 1.5 and Rank 1.75 can be further divided between the image-sticking levels Rank 1 and Rank 2 according to the three gray levels 120.25, 120.5 and 120.75 further divided between the gray level 120 and the gray level 121. More image-sticking levels can be accurately measured according to the present invention compared with the conventional methods which can only measure the image-sticking levels of Ranks 0, 1, 2, 3 . . . etc.

The middle gray levels 120.25, 120.5 and 120.75 divided between the gray level 120 and the gray level 121, and the image-sticking levels Rank 1.25, Rank 1.5 and Rank 1.75 divided between the image-sticking levels Rank 1 and Rank 2 are taken as an example in the present embodiment. However, the present invention is not limited by dividing the middle gray levels just between the gray level 120 and the gray level 121, the middle gray levels can also be divided between the gray level 119 and the gray level 120. The present invention is also not limited by dividing only three middle gray levels between the gray level M and the gray level M+1 or between the gray level M−1 and the gray level M, more middle gray levels can be further divided there between. Therefore, various degrees of the image-sticking levels can be divided between the image-sticking levels Rank 0~1, Rank 1~2 and Rank 2~3.

In addition, the LCD having the normally white frame when not being driven is taken as an example in the present embodiment. Therefore, in this embodiment, the image-stick region corresponds to a region having a low gray level (e.g. gray level 1) in the image-stick test frame. The method of the present invention can also be applied to the displays such as the LCD or the plasma display panel having the normally black frame when not being driven. In the displays having the normally black frame when not being driven, the image-stick region corresponds to the region having a high gray level (e.g. gray level N) in the image-stick test frame.

The measuring method of the present invention may accurately measure the image-sticking levels and benefit the production yield. For example, if a buyer requires the products having the image-sticking level below Rank 2 (Rank 2 is not included), those unqualified products having the image-sticking level of Rank 2 according to the conventional measuring method may have the image-sticking level of Rank 1.75 according to the measuring method of the present invention, and will meet the requirement of the buyer.

The Second Embodiment

Figure 4D:
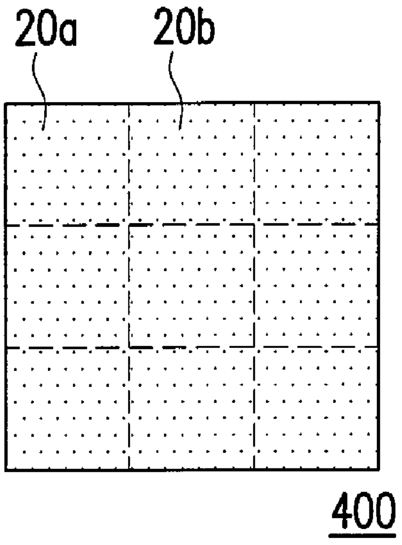

To improve the measuring accuracy of the image-sticking phenomenon of the displays, an optical measuring instrument (not shown) is further provided for judging whether the boundary of the images between the image-stick region 20*a* and the non-image-stick region 20*b* shown in FIGS. 4A~4D is the lightest. The optical measuring instrument includes a luminance meter, a calorimeter and a spectrometer. The optical measuring instrument measures the images displayed on the image-stick region 20*a* and on the non-image-stick region 20*b*, and obtains a first value and a second value. When the first value and the second value are identical, the boundary of the images between the image-stick region 20*a* and the non-image-stick region 20*b* is the lightest (as shown in FIG. 4D).

In detail, if the optical measuring instrument is the luminance meter, the first value and the second value are brightness values. Thus, judging of the lightest boundary of the images between the image-stick region 20*a* and the non-image-stick region 20*b* will not rely on a sense of human eyes. Accordingly, not only is the human resources conserved and automation achieved, but also the measuring accuracy is improved.

The Third Embodiment

Besides the measuring method described in the first and the second embodiments, the present embodiment provides another method for automatically measuring an image-sticking phenomenon, which will be described as follows. The present invention provides another method of measuring the image-sticking phenomenon of a display. First, a display having a plurality of pixels is provided. Next, an image-stick test frame is displayed on the display. As shown in FIG. 1, the image-stick test frame is composed of at least a first pattern and at least a second pattern 10*b*, wherein the gray level of the first pattern 10*a* is different from that of the second pattern 10*b*, or as describe in the first embodiment, the gray level of the first pattern 10*a* is gray level 1, and the gray level of the second pattern 10*b* is gray level N. In addition, it would be understood by those skilled in the art, arrangement of the image-stick test frames can be adjusted according to the actual requirement. For example, the image-stick test frames can be arranged as that shown in FIG. 2 and FIG. 3. Here, arrangement of the image-stick test frames shown in FIG. 1 is taken as an example in the present embodiment.

Figure 8:
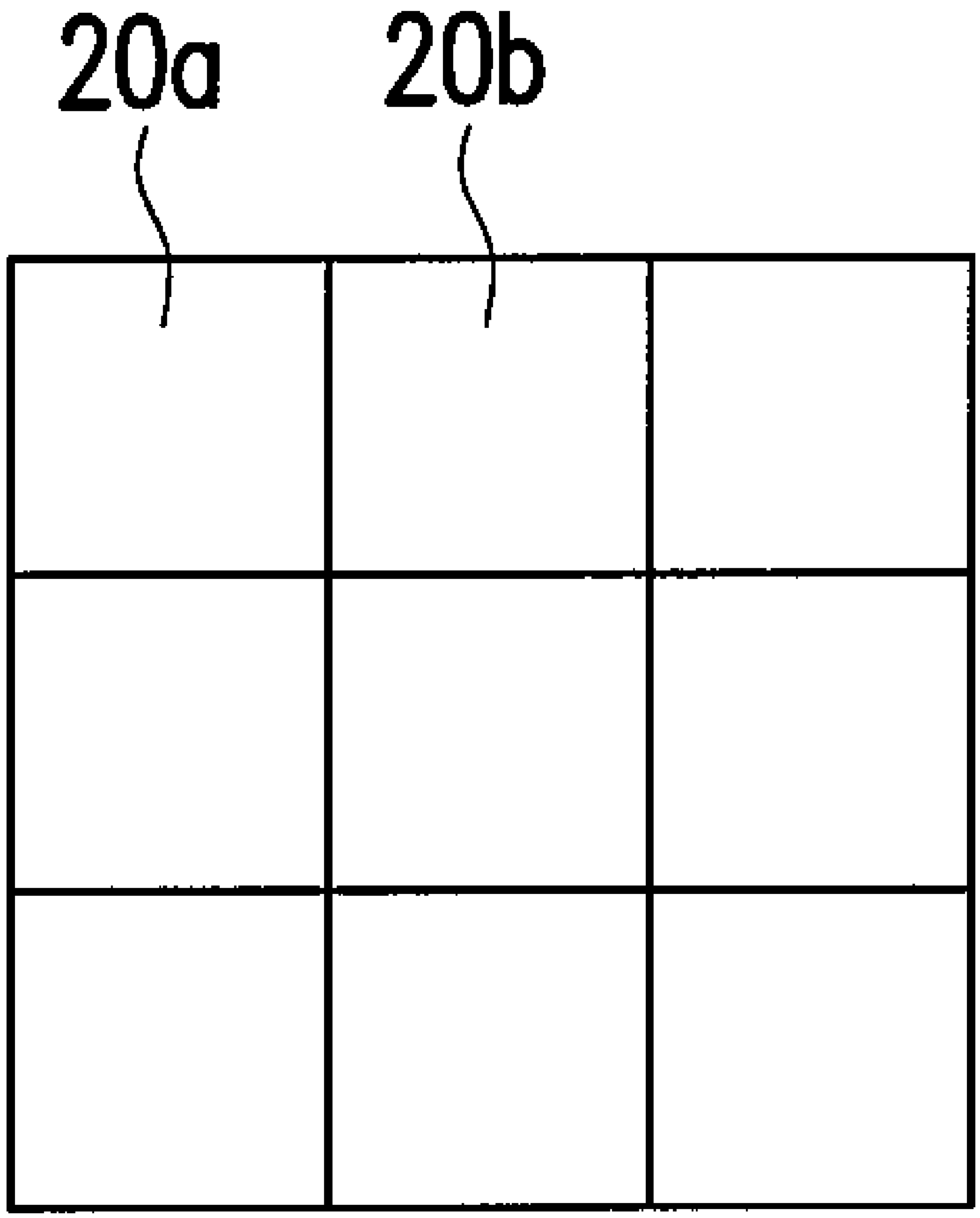
FIG. 8 is a schematic diagram illustrating an image-stick region and a non-image-stick region of a display according to the third embodiment of the present invention.

After the image-stick test frame is displayed for a while, an image-stick region 20*a* and a non-image-stick region 20*b* as shown in FIG. 8 are formed on the display. In other words, this display has an undesirable image-sticking phenomenon.

Next, referring to FIG. 4A, a measuring frame 400 is displayed on the display, wherein the gray level of the non-image-stick region 20*b* in the measuring frame is an integer (e.g. gray level M). Next, at least one middle gray level is displayed on the image-stick region 20*a* in the measuring frame, wherein the value of the middle gray level is between two consecutive integers (e.g. between the gray level M and the gray level M+1, or between the gray level M−1 and the gray level M). Since a general display cannot directly display the images having the middle gray levels such as 120.25, 120.5, 120.75 or more subtle gray levels, the middle gray levels can be formed based on the edition of space (as shown in FIGS. 5A, 5B, 6A, 6B, 7A and 7B) or the edition of time as described in the first embodiment. It should be noted that the middle gray levels could be formed between arbitrary two consecutive integers, which are not limited thereto by the present invention.

Next, to automate the process of measuring the image-sticking levels, an image capture device is provided for capturing the images respectively displayed on the image-stick region 20*a* and the non-image-stick region 20*b*, so as to obtain an image data. The image capture device may be a charge coupled device (CCD). More particularly, the image data captured by the CCD includes at least a color and a brightness of each pixel displayed on the image-stick region 20*a* or the non-image-stick region 20*b*. Next, an image processing procedure is performed on the image data to obtain an evaluation value D. Last, the evaluation value is converted into the image-sticking level. The above description describes the main steps of this measuring method.

It should be noted that the aforementioned image processing procedure is a series of mathematic operations performed on the image data. For example, the image processing procedure of the present embodiment includes the following steps. First, the color and brightness of the adjacent pixels are compared to obtain a plurality of variation values ΔE of the pixels. The variation value ΔE may be a color variation value ΔC or a brightness variation value ΔB. In an embodiment, the variation value ΔE may be simultaneously changed with the color variation value ΔC and the brightness variation value ΔB. The relationship there between may be a partial differential equation, wherein the color and the brightness are independent variables, and the variation value ΔE is a response variable.

Accordingly, the color variation value ΔC and the brightness variation value ΔB of each pixel can be calculated. If there is an obvious boundary between the images respectively displayed on the image-stick region 20*a* and on the non-image-stick region 20*b*, it means the color variation value ΔC or the brightness variation value ΔB of the adjacent pixels is excessive, or both of the two variation values are excessive. Therefore, a noticeable distortion (JND) is provided, and the pixels having the variation value ΔE greater than the JND are detected, so as to obtain an evaluation value D. More particularly, the JND is a minimum value that can be sensed by human eyes, and when the variation value ΔE of a pixel is greater than the minimum value, the pixel can be sensed by human eyes.

The evaluation value D may be obtained by calculating a summation of multiplication of the number of the pixels having the variation value ΔE being greater than the JND and the corresponding variation values ΔE. The more the pixels having the variation value being greater than the JND have, the bigger the region with abnormal images is. The bigger the variation value ΔE is, the more intense the undesirable visual senses have, and the poorer quality the displays have.

In other words, the factors such as the area, the color and the brightness are all taken into consideration in the evaluation value D of the present embodiment. Certainly, those skilled in the art may establish their own conversion method of the evaluation value D to involve other different factors. The conversion method of the present embodiment is only used as an example, and has no intention to limit the present invention.

It should be noted that the present embodiment may also adopt the method shown in FIGS. 4A~4D, by which a plurality of the middle gray levels are sequentially displayed on the image-stick region 20*a* of the display. The image capture device may sequentially capture the images displayed on the image-stick region 20*a* and on the non-image-stick region 20*b* when each of the middle gray levels is applied. When the boundary of the images respectively displayed on the non-image-stick region 20*b* and the image-stick region 20*a* is the lightest, the image-sticking level measured under this circumstance can be adopted.

Figure 9A:
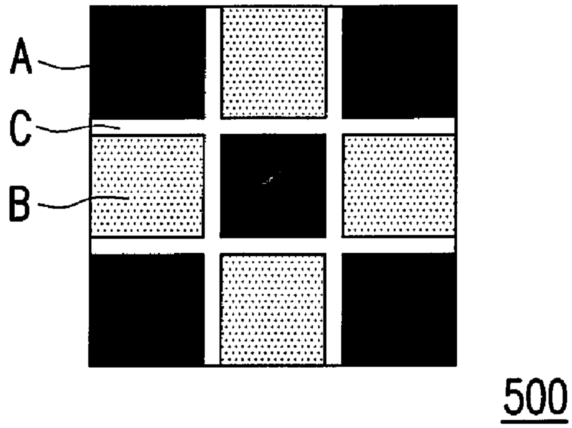
FIG. 9A and FIG. 9B are schematic diagrams respectively illustrating a detecting block according to the third embodiment of the present invention.

It should be noted that since the data of each pixel, such as the color and the brightness can be captured by the image capture device, the image and the data having a low noise can be obtained by suitably blurring a focus of the image capture device or other method. Then a desirable data can be obtained by performing mathematic operations on the data having the low noise. To facilitate an identification of human eyes, the mathematic operations of the data can be shown in figures. For example, if the variation values ΔE of the pixels are calculated, a detecting block 500 of FIG. 9A can be illustrated.

It should be noted that the detecting block 500 is not an actual color image, the detecting block 500 is used for recording the positions of the pixels and the features of the corresponding variation values ΔE. In detail, approximately a same deep dark is shown in a region A, and approximately a same light gray is shown in a region B, and a region C is a bright region, which represent the variation values ΔE of the pixels in the region A are approximately the same, the variation values ΔE of the pixels in the region B are approximately the same, and the variation values ΔE of the pixels in the region C are abnormal. It should be noted that although the region C is the bright region, the variation values ΔE of the pixels in the region C are not uniform and have some difference there between. In other words, the variation values ΔE of the pixels in the region C is greater than the JND. Next, a boundary enhancement can be performed on FIG. 9A, so as to form FIG. 9B.

Figure 9B:
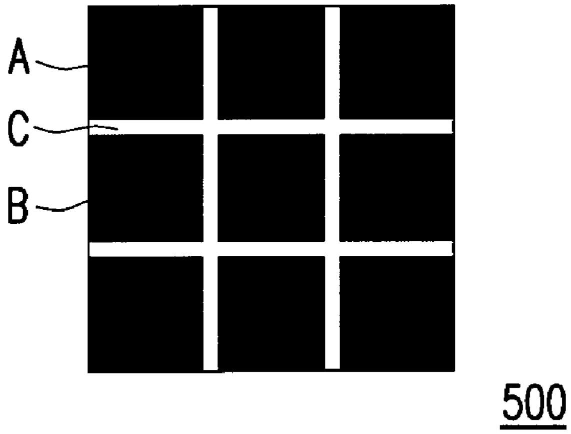

As shown in FIG. 9B, the region A and the region B may display the similar deep dark to highlight the bright region of region C. In an embodiment, a variation values ΔE' is obtained from the variation values ΔE by performing the boundary enhancement. Then, the evaluation value D is obtained by calculating a summation of multiplication of the width of the regions C and the corresponding variation values ΔE'. Last, the evaluation value D is converted into the image-sticking level. Certainly, the more the abnormal pixels have, the wider the region C is. In the aforementioned figure operations, numerical filtering can be performed according to an actual requirement to remove the undesirable numerical noise, or the values can be smoothed (e.g. differential operation) to facilitate the mathematic operations, which are all not limited by the present invention.

In summary, since the image-sticking levels can be accurately measured according to the methods of the present invention, when a new processing condition is added and the image-sticking level is changed, the variation of the image-sticking level due to the new processing condition can be accurately measured. Moreover, the measuring methods of the present invention can be automatically implemented by applying the image capture device and the image processing procedure. Accordingly, the measuring cost is reduced and the measuring accuracy is improved. In addition, the measuring methods of the present invention can be applied to various kinds of displays, not just the LCD and the plasma display panel. Therefore, application of the methods is relatively wide.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method of measuring image-sticking phenomenon of a display, comprising:

providing a display having N gray levels;

displaying an image-stick test frame on the display, wherein the image-stick test frame comprises at least a first pattern having a low gray level and at least a second pattern having a high gray level;

displaying the image-stick test frame for a predetermined time period so that an image-stick region and a non-image-stick region are formed on the display, wherein the image-stick region is located at a region where one of the first and the second patterns is positioned, and the non-image-stick region is located at a region where another one of the first and the second patterns is positioned;

displaying a measuring frame on the display, wherein the non-image-stick region in the measuring frame has a standard gray level M, and sequentially displaying a plurality of middle gray levels on the image-stick region in the measuring frame, wherein the middle gray levels are between M and M+1 or between M−1 and M; and judging which one of the middle gray levels make a boundary between the non-image-stick region and the image-stick region in the measuring frame lightest, and then converting the middle gray level into an image-sticking level.

2. The method of measuring image-sticking phenomenon of a display as claimed in claim 1, wherein the step of displaying the middle gray levels between M and M+1 or between M−1 and M on the image-stick region in the measuring frame comprises:

displaying the gray level M on a part of pixels located on the image-stick region and displaying the gray level M+1 or M−1 by the other part of pixels; and forming a plurality of the middle gray levels by adjusting a number of the pixels displaying the gray level M and a number of the pixels displaying the gray level M+1 or M−1.

3. The method of measuring image-sticking phenomenon of a display as claimed in claim 1, wherein the step of displaying the middle gray levels between M and M+1 or between M−1 and M on the image-stick region in the measuring frame includes:

alternately displaying the gray level M and the gray level M+1 or M−1, wherein a time for displaying the gray level M is a first time, and a time for displaying the gray level M+1 or M−1 is a second time; and forming a plurality of the middle gray levels by adjusting a display time or a display frequency of the first time and the second time.

4. The method of measuring image-sticking phenomenon of a display as claimed in claim 1, wherein distribution of the first pattern and the second pattern of the image-stick test frame comprises a chessboard distribution.

5. The method of measuring image-sticking phenomenon of a display as claimed in claim 1, wherein the first pattern of the image-stick test frame is located in the middle of the image-stick test frame, and the second pattern surrounds the first pattern.

6. The method of measuring image-sticking phenomenon of a display as claimed in claim 1, wherein the second pattern of the image-stick test frame is located in middle of the image-stick test frame, and the first pattern surrounds the second pattern.

7. The method of measuring image-sticking phenomenon of a display as claimed in claim 1, wherein the display comprises a liquid crystal display or a plasma display panel.

8. The method of measuring image-sticking phenomenon of a display as claimed in claim 1, wherein a gray level of the first pattern is gray level 1, and a gray level of the second pattern is gray level N.

9. The method of measuring image-sticking phenomenon of a display as claimed in claim 1, wherein judgment of whether the boundary between the non-image-stick region and the image-stick region is the lightest further comprises:

providing an optical measuring instrument; and measuring images displayed on the image-stick region and on the non-image-stick region of the display by the optical measuring instrument to obtain a first value and a second value, wherein when the first value and the second value are identical, the boundary between the non-image-stick region and the image-stick region is lightest.

10. The method of measuring image-sticking phenomenon of a display as claimed in claim 9, wherein the optical measuring instrument comprises a luminance meter, a colorimeter and a spectrometer.

11. A method of measuring image-sticking phenomenon of a display, comprising:

providing a display having a plurality of pixels;

displaying an image-stick test frame on the display, wherein the image-stick test frame comprises at least a first pattern and at least a second pattern, and a gray level of the first pattern is different from that of the second pattern;

displaying the image-stick test frame for a predetermined time period so that an image-stick region and a non-image-stick region are formed on the display;

displaying a measuring frame on the display, wherein the non-image-stick region in the measuring frame has a standard gray level M; sequentially displaying a plurality of middle gray levels on the image-stick region in the measuring frame, wherein the middle gray levels are between M and M+1 or between M−1 and M sequentially capturing images displayed on the image-stick region and the non-image-stick region by an image capture device to form a plurality of image dates;

performing an image processing procedure on the image dates to judge which one of the middle gray levels make a boundary between the non-image-stick region and the image-stick region in the measuring frame lightest, and then converting the middle gray level into an image-sticking level.

12. The method of measuring image-sticking phenomenon of a display as claimed in claim 11, wherein the image data comprises at least a color and a brightness of each pixel on the image-stick region or the non-image-stick region.

13. The method of measuring image-sticking phenomenon of a display as claimed in claim 12, wherein the image processing procedure comprises:

respectively comparing the color and brightness of each of the pixels to the color and brightness of other pixels respectively adjacent to each of the pixels to obtain a plurality of variation values for each of the pixels; and providing a noticeable distortion (JND) and detecting the pixels having the variation values being greater than the JND to obtain the evaluation value.

14. The method of measuring image-sticking phenomenon of a display as claimed in claim 11, wherein the image capture device comprises a charge coupled device (CCD).

* * * * *